United States Patent [19]
Adams et al.

[11] 3,770,618
[45] *Nov. 6, 1973

[54] HYDRODESULFURIZATION OF RESIDUA

[75] Inventors: Clark E. Adams, Baton Rouge, La.; William T. House, Seabrook, Tex.

[73] Assignee: Esso Research and Engineering Company, Linden, N.J.

[ * ] Notice: The portion of the term of this patent subsequent to Apr. 28, 1987, has been disclaimed.

[22] Filed: Mar. 20, 1972

[21] Appl. No.: 236,383

Related U.S. Application Data

[63] Continuation-in-part of Ser. Nos. 648,604, June 26, 1967, Pat. No. 3,509,044, and Ser. No. 20,847, March 18, 1970, abandoned.

[52] U.S. Cl. ............................. 208/216, 252/455 R
[51] Int. Cl............................................. C10g 23/02
[58] Field of Search ..................................... 208/216

[56] References Cited
UNITED STATES PATENTS

| | | |
|---|---|---|
| 3,169,918 | 2/1965 | Gleim ................................. 208/216 |
| 3,340,180 | 9/1967 | Beuther et al. ..................... 208/216 |
| 3,425,934 | 2/1969 | Jacobson et al. ................... 208/216 |
| 3,471,399 | 10/1969 | O'Hara ............................... 208/216 |
| 3,509,044 | 4/1970 | Adams et al. ...................... 208/216 |
| 3,531,398 | 9/1970 | Adams et al. ...................... 208/216 |
| 3,546,103 | 12/1970 | Hamner et al. .................... 208/216 |
| 3,630,888 | 12/1971 | Alpert et al. ....................... 208/216 |
| 3,686,095 | 8/1972 | Coons, Jr. et al. ................. 208/216 |

*Primary Examiner*—Delbert E. Gantz
*Assistant Examiner*—G. J. Crasanakis
*Attorney*—Leon Chasan et al.

[57] ABSTRACT

A process for the hydrodesulfurization of residua. A residuum is contacted with a high activity maintenance catalyst comprising an oxide or sulfide of cobalt or nickel and an oxide or sulfide of molybdenum or tungsten deposited on a silica-stabilized alumina support, having a maximum of its surface area in pores having 30 to 80 A diameters. A preferred catalyst is characterized as one having at least 180 $M^2/g$. of surface area in pores with diameters ranging from 30 to 80 A, and less than 0.25 cc./g. of the pore volume in pores having a diameter greater than 100 A.

13 Claims, 3 Drawing Figures

HYDRODESULFURIZATION OF RESIDUA

BACKGROUND OF THE INVENTION

This application is a continuation-in-part of our applications Ser. No. 648,604, filed June 26, 1967 (now U.S. Pat. No. 3,509,044) and Ser. No. 20,847, filed Mar. 18, 1970, now abandoned.

FIELD OF THE INVENTION

This invention relates to a process for the hydrodesulfurization of a hydrocarbon residuum feed, especially a petroleum residua. More particularly, the invention relates to the hydrodesulfurization of a petroleum residuum in the presence of a catalyst having a maximum of its surface are in pores having 30 – 80 A diameter. A preferred catalyst is characterized as one having at least 180 M²/g. of surface area in pores with diameters ranging from 30 – 80 A, and less than 0.25 cc./g. of the pore volume in pores having a diameter greater than 100 A.

DESCRIPTION OF THE PRIOR ART

The process of the invention is applied to a hydrocarbon residuum feed, especially a petroleum residuum feedstock. The three major characteristics of residua other than molecular weight which distinguish them from distillates are that residua contain (1) asphaltenes and other high molecular weight aromatic structures which severely inhibit the rate of hydrodesulfurization, and cause catalyst deactivation, (2) ash forming constituents such as metallo-organic compounds which result in catalyst contamination and interfere with catalyst regeneration, and (3) a relatively large quantity of sulfur which gives rise to objectionable quantities of $SO_2$ and $SO_3$ upon combustion in industrial furnaces.

Hydrodesulfurization has long been recognized as a means of removing sulfur from residual oils and asphalts. In addition to sulfur removal, hydrodesulfurization processes generally result in improvement in other properties of residual fuels by nitrogen removal and metals removal. In spite of these benefits, the commercial application of hydrodesulfurization to residua to produce improved residua fuels has been minimal, due to low economic incentives for improved fuel oil properties and high operating costs associated with the relatively high pressure required. The hydrogen consumption and short catalyst life have also hindered the utilization of such processes.

The principal object of the present invention is to reduce the sulfur content of a hydrocarbon residuum feed, especially petroleum residua without significantly changing the properties of the oil. The process is centered on a generally nondestructive hydrodesulfurization process, as distinguished from destructive hydrogenation or hydrocracking. However, some hydrocracking may take place concurrently with the hydrodesulfurization without departing from the scope of the present invention. Thus, conversion to gas and light ends is minimized. Another object of this invention is to provide a process specifically designed to treat a feed consisting entirely of petroleum residuum as distinguished from naphthas, gas oils or residua containing added diluents. In most cases satisfactory processes and catalysts have been developed for the lighter materials and diluted feedstocks.

Another object of this invention is to provide a hydrodesulfurization process for petroleum residua which is economically feasible in view of the low return available from the marketing of the treated residuum as residual fuel oil. Cost studies have shown that the key factors are catalyst activity and catalyst activity maintenance. Therefore, the specific object of the invention is to provide a process which is carried out at moderate pressure, temperature and other conditions with a catalyst which features low cost and high activity maintenance. Further objects and advantages of the invention will be apparent from the following description which discloses certain nonlimiting embodiments.

SUMMARY OF THE INVENTION

The objects of the present invention are attained by hydrodesulfurizing hydrocarbon residua, especially petroleum residua at moderate conditions in the presence of a catalyst comprising an oxide or sulfide of nickel or cobalt and an oxide or sulfide of molybdenum or tungsten deposited upon a support material comprising from about 0.1 to about 6 wt. percent silica and from about 94 – 99.9 wt. percent alumina. A preferred catalyst is characterized as one having at least 180 M²/g. of surface area in pores with diameters ranging from 30 – 80 A, and less than 0.25 cc./g. of the pore volume in pores having a diameter greater than 100 A.

The support material can be prepared by precipitation of a hydrous alumina from a mixture containing an aqueous alkaline aluminate solution, an aluminum salt of a mineral acid, an alkali metal silicate, and a compound selected from the group consisting of aldonic acids and salts of aldonic acids, the hydrous alumina precipitate being in the form of a slurry, filtering the slurry to increase the concentration of alumina solids in the slurry and subsequently spray drying the slurry to form an extrudable, non-glass-like catalyst support. More specifically, the silica-stabilized alumina support is one having a surface area of at least 150 M²/g. and a maximum of the surface area in pores having diameters ranging from 30 – 80 A. This support can be prepared by precipitation from a mixture having a final pH of less than 9.5, a temperature ranging from 110° up to 120°F., the mixture containing an aqueous alkaline aluminate solution, an aluminum salt of a mineral acid, a mineral acid, an alkali metal silicate, and a compound selected from the group consisting of aldonic acids and salts of aldonic acids, the precipitate forming a slurry of hydrous alumina, filtering the slurry to increase the concentra of alumina solids in the slurry, and subsequently spray drying the slurry to form an extrudable catalyst support. The spray dried catalyst support has a bulk density of less than 0.7 g./cc.

In a preferred embodiment the pH and the temperature during precipitation are closely controlled.

DESCRIPTION OF THE PREFERRED EMBODIMENTS

Figure 1:
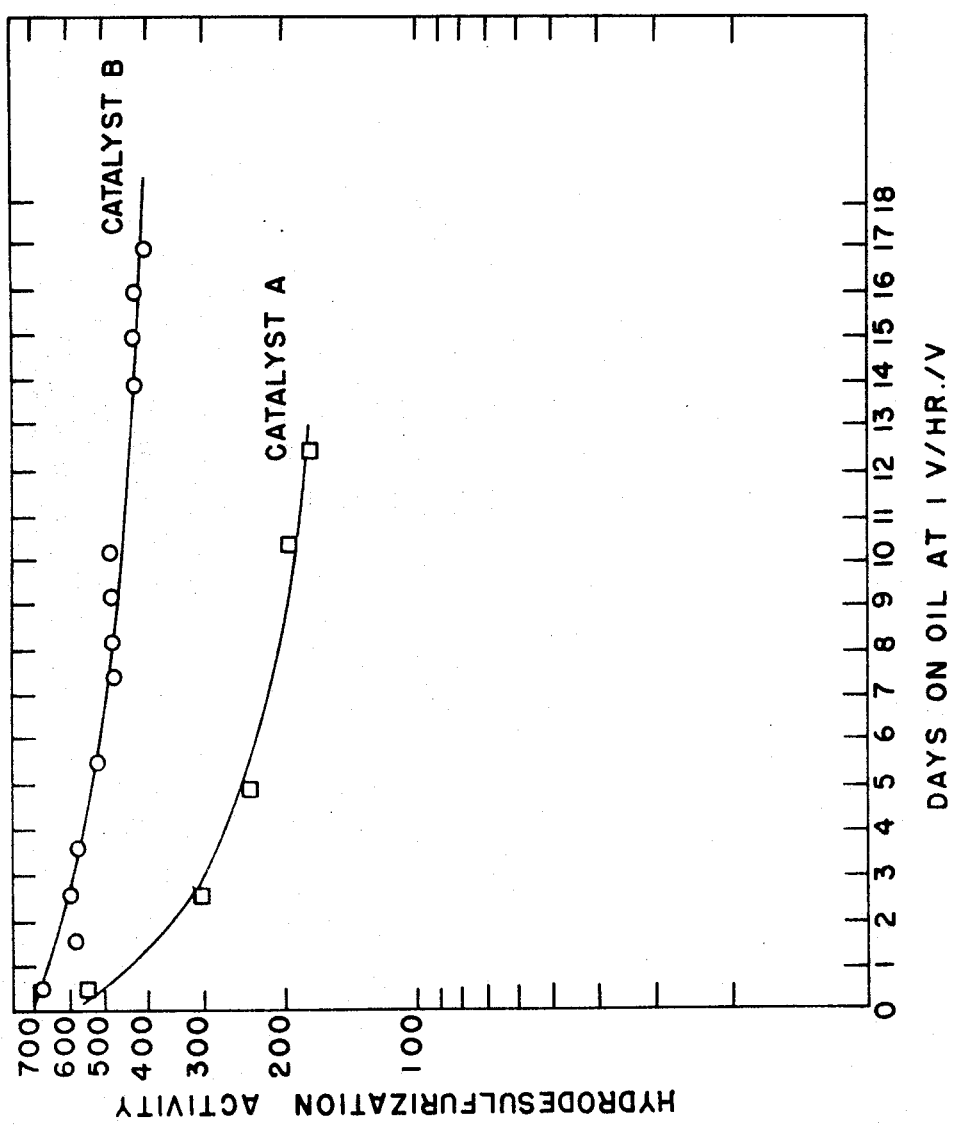

The preferred process feedstock is a petroleum residuum obtained from distillation or other treating or separation process. From 30 to 100 percent of the feed boils above 900°F. The process is designed to treat a residuum without any pre-processing; however, when the metal content of the oil is greater than about 500–1,000 ppm, it may be necessary to employ a metals removal step such as HF treatment or solvent precipitation with propane, butane, mixtures of propane and butane, pentane, hexane or naphtha. The petroleum residuum can be a blend of high boiling materials such as atmospheric bottoms, vacuum bottoms, deasphalted oil, visbreaker products, heatsoaked materials, gas oil cuts, and the like. The feedstocks of the invention contain relatively large amounts of sulfur, asphaltenes, metals and ash. Some of these materials or conversion products thereof deposit on the hydrodesulfurization catalyst when hot oil is brought into contact with the catalyst surface.

The feedstocks treated have the following properties and inspections:

TABLE I

PROPERTIES OF PETROLEUM RESIDUA

|  | Operational Range | Narrow Range | Feed Example 3 Safaniya Atmos. Resid.) |
|---|---|---|---|
| % Boiling above 900°F. | 30–100 | 50–100 | 60 |
| Gravity, °API | –5 to 25 | 10–20 | 15.4 |
| Viscosity, SFS at 122°F. | 50–5000+ | 100–1000 | 309 |
| Sulfur, Wt. % | 1–8 | 3–6 | 4.0 |
| Nitrogen, Wt. % | 0–1 | 0.001–0.5 | 0.26 |
| Metals (ppm) Total | 20–1000 | 80–500 | 127 |
| Vanadium (ppm) | 10–500 | 30–300 | 84 |
| Nickel (ppm) | 5–200 | 10–100 | 32 |
| Asphaltenes, Wt. % | 1–20 | 2–10 | 7.2 |
| Pour, °F. | 0–200 | 25–100 | 45 |

The composition and characteristics of the support are most important aspects of the invention. The alumina support of the present invention is stabilized with silica. Hydrodesulfurization catalyst supports containing silica have been suggested in the past. However, silica was included in the support when the feedstock was gasoline or light gas oil or when a significant amount of hydrocracking was desired. It was felt that the presence of any significant amount of silica in the hydrodesulfurization of residuum would cause significant cracking with consequent coke make and catalyst fouling. Thus, it was entirely unexpected that relative catalyst activity could be greatly improved by the presence of a relatively small quantity of silica in the catalyst support, i.e., as little as about 0.1 wt. percent, preferably from about 0.5 to about 6 wt. percent.

The support can be prepared by precipitating the oxides or hydrated oxides of aluminum and silicon from aqueous solutions of water salts of these metals. For example, suitably proportions of the water soluble salts of aluminum such as the sulfate, chloride or nitrate and suitable proportions of water soluble silicon salts such as sodium silicate are precipitated from solution by adjusting the pH of the solution with acidic or basic material. The precipitate is washed and othewise treated to remove impurities as necessary. The support can be impregnated with the metals while it is wet or after drying and calcining.

A preferred method of preparing the catalyst of the invention is to treat alkaline aqueous aluminate solutions which contain predetermined amounts of silica with acidic reagents to precipitate an aluminosilicate in the hydrous form. A slurry produced by this technique is then dried by known methods to furnish a preferred catalyst support of this invention. The supports of the types prepared above are then imregenated with metals which promote a hydrodesulfurization reaction.

The preferred alkaline aqueous aluminate solution is a solution of sodium aluminate. It is understood that other alkali metal aluminates can be used except they are not preferred from an economic standpoint.

The acidic reagents which can be used are the mineral acid salts of aluminum, e.g., aluminum halides, nitrates, and sulfates. Also useful are the well-known mineral acids themselves, e.g., hydrochloric nitric, sulfuric acids, and the like.

The conditions for preparing the support are so controlled that the finished support has an apparent bulk density of less than 0.70 g./cc. It is further characterized as being opaque as distinguished from glassy in appearance (indicating that a large quantity of the alumina is in a crystaline form). The catalyst is extrudable.

In preparing these preferred catalytic materials, the following table contains a summary of the preferred conditions.

TABLE II

| Conditions | Operational Range | Preferred Range |
|---|---|---|
| I. Concentration of starting aluminate solution, expressed as $Al_2O_3$ | 1.2–5% | 1.2–1.7% |
| II. Precipitation Temperature | 105°–120°F. | 110°–120°F. |
| III. pH | 5–9.5 | 6–9 |
| IV. Reaction Time | ¼–6 Hrs. | ¼–2 Hrs. |

As seen above, the alumina concentration, expressed as $Al_2O_3$, of the aqueous alkali aluminate solution must be beween 1.2 and 5.0, preferably between 1.2 and 3.0, the most preferred concentration being between 1.2 and 1.7 percent by weight. It has been found that close control of the alumina concentration within the stated ranges is a material factor in producing a support which can be extruded in commercial equipment.

Other important variables include pH and temperature. The precipitation must be effected at a pH between 5 and 9.5, preferably between 6 and 9. Temperatures ranging between 105° and 120°F., preferably 110° – 120°F. must be employed.

In the most preferred embodiment the silica-alumina support is prepared in the presence of a material selected from the group consisting of an aldonic acid or an aldonate, preferably a gluconate or gluconic acid. Galactonic acid, arabonic acid, xylonic acid, manoic acid, and salts thereof can be used as well. Suitable aldonates, salts or aldonic acids, include the sodium, potassium, zinc, magnesium, calcium and lithium salts of gluconic acid or other aldonic acids. This material is used in the initial solution in amounts ranging from 0.1 – 6.0 wt. percent based on the alumina content of the solution. It appears that the addition of aldonates or aldonic acids in the preparation of the silica-alumina base has a beneficial effect on the physical characteristics of the final catalyst and its effectiveness in hydrodesulfurization of residuum.

Using the general reaction conditions found in Table II, the support resulting from the reaction is in the form of a dilute slurry. This slurry may then be concentrated and subjected to spray-drying operations at temperatures ranging between 200°–2,000°F., preferably between 200°–500°F. Spray-drying, particularly at the stated conditions, preserves the base in the desired form.

Using conventional techniques known to the catalyst art, the spray-dried material may be subjected to waterwashing to remove excess alkali metal ions and sulfate ions. The support can then be impregnated with the catalytic metals and extruded or pilled or otherwise formed into any desired physical form.

The aforementioned silica-alumina hydrogels can be composited with other synthetic and/or semi-synthetic aluminas, silica gels, and/or other silica-alumina-clay hydrogen compositions for the purpose of adjusting the alumina and/or silica present during impregnation. It is essential that the silica content of the catalyst be maintained in the range of 0.1–6 wt. percent, preferably from about 0.5 –6 wt. percent and more preferably 1 to 5 wt. percent. The resulting catalyst, when calcined, is characterized as one having at least 180 $M^2$/g. of surface area in pores with diameters ranging from 30 to 80 A, and less than 0.25 cc./g. of the pore volume in pores having a dimaeter greater than 100 A.

The active metallic components in the finished catalyst are a Group VIB oxide or sulfide, specifically a molybdenum or tungsten oxide or sulfide selected from the group consisting of molybdenum oxide, molybdenum sulfide, tungsten oxide, tungsten sulfide, and mixtures of these and a Group VIII oxide or sulfide, specifically a nickel or cobalt oxide or sulfide selected from the group consisting of nickel oxide, cobalt oxide, nickel sulfide and cobalt sulfide and mixtures of these. The preferred active metal oxides or sulfides are nickel oxide with molybdenum oxide and cobalt oxide with molybdenum oxide. The oxide catalysts are preferably sulfided prior to use.

The final catalyst contains the following amounts of each component:

TABLE III

CATALYST COMPOSITION

|  | Operational Range (Wt. %) | Preferred Range (Wt. %) |
|---|---|---|
| Nickel or Cobalt (as oxide) | 1 to 15 | 2 to 10 |
| Tungsten or Molybdenum (as oxide) | 5 to 25 | 10 to 20 |
| Silica | 0.1 to 6 | 1 to 5 |
| Alumina | 93.9 to 54 | 87 to 65 |

The structure of the catalyst is also an important aspect of the invention. In the hydrodesulfurization of a hydrocarbon residuum, e.g., a petroleum residuum, a criticality of pore size has been found with respect to activity maintenance. It has been found that pores having a pore diameter in the 30–80 A range are of critical importance with heavy residual feeds. Evidently, pores of smaller diameter than about 30 A are ineffective in desulfurizing the high molecular weight molecules present in residues and pores of larger diameter than about 80 A are rapidly deactivated. It has been found that a maximum (greater than 50 percent) of the surface area should be present in pores having a pore diameter in the 30–80 A range. A preferred catalyst is characterized as one having at least 180 $M^2$/g. of surface area in pores with diameters ranging from 30 to 80 A, and less than 0.25 cc./g. of the pore volume in pores having a diameter greater than 100 A.

The pore volume distribution of a catalyst as defined by this invention is measured by nitrogen adsorption isotherm where the volume of nitrogen adsorbed is measured at various pressures. This technique is described in Ballou, et al., Analytical Chemistry, Vol. 32, April, 1960, pp. 532–536. The pore diameter distributions for the examples of the invention were obtained using a Model No. 4-4680 Adsorptomat manufactured by the American Instrument Company, Silver Springs, Md. One skilled in the art can select catalyst manufacturing process steps and process conditions within the specific ranges disclosed herein to prepare catalysts having the required pore diameter, pore size distribution, pore volume, and surface area.

EXAMPLE 1

The following illustrates a typical catalyst preparation.

Three solutions are prepared, e.g., A, B, and C:

| Ingredient | Amount |
|---|---|
| Solution A* Water | 36 gallons |
|   Sodium Silicate Solution — 28% $SiO_2$ | 113 cc. |
|   Sodium Aluminate 23.5% $Al_2O_3$ Solution | 5323 cc. |
|   48% Gluconic Acid Solution | 76 cc. |
| Solution B 98% $H_2SO_4$ | 850 cc. into 4.5 gallons water |
| Solution C 9.5% Alum Solution | 3.3 gallons |

*Total $Al_2O_3$ in solution — 1.3%.

Solution B is added to Solution A over a period of 23 minutes. At this point the temperature of the reaction mixture is 118°F.

Solution C is then added to the mineral acid solution over a 19-minute period. The tempeature during addition remains at 118°F. The final pH, after the above additions, is 8.8. The slurry was filtered, reslurried, spray dried, washed to remove soluble salts, and redried.

The finished silica-alumina support has a pore volume of 2.36 cc./g., a surface area of 310 $M^2$/g., and an apparent bulk density of 0.18 g./$c^3$.

EXAMPLE 2

A silica-alumina support is prepared in the manner set forth in Example 1 and is composited with suitable quantities of molybdenum oxide and cobalt carbonate by hydrothermal impregnation. The slurry is filtered and dried to provide a catalyst (dry weight basis containing 3.5 percent cobalt oxide, 12.0 percent molybdenum oxide, 1.7 % $SiO_2$, and the balance alumina). This catalyst is hereinafter referred to as Catalyst B. The support can be impregnated with the other hydrogenation metals of the invention, i.e., nickel and tungsten in the same manner.

A commercial catalyst was selected for the purpose of obtaining comparative data. It contained 3.5 weight percent cobalt oxide, 12.5 weight percent molybdenum oxide, 0.2 weight % $SiO_2$, and the balance alumina. This catalyst is designated hereinafter as Catalyst A.

The hydrodesulfurization reaction is carried out in a conventional reactor of the fixed bed, moving bed, or fluidized bed type. In addition to these reactor types, it has been found that the catalyst of the present invention is also extremely useful when used in a slurry or ebullient bed. Considering the nature of the feedstock, the reaction conditions are relatively mild. The oil is contacted in the liquid phase. Typical conditions for the hydrodesulfurization are as follows:

TABLE IV

REACTION CONDITIONS

|  | Operational Range | Preferred Range |
|---|---|---|
| Temperature, °F. | 500–825 | 650–800 |
| Pressure, Psig. | 200–2500 | 500–1800 |
| Space Velocity, V/V/Hr. | 0.01–5.0 | 0.1–2.0 |
| Hydrogen Rate, SCF/Bbl. | 300–10,000 | 1000–7500 |

With these conditions, viscosity reduction of the oil due to processing is not excessive and fuel oil viscosities which meet specifications are easily obtained.

The following comparative examples and tables demonstrate the improvements in hydrodesulfurization of residuum which can be obtained with the catalysts of the invention as compared to a group of prior art catalysts.

EXAMPLE 3

A pilot plant unit containing 200 cc. of catalyst was used in this example. The oil was passed down through the catalyst bed.

The catalyst was calcined overnight at 1,200°F. and then sulfided using 5 wt. percent carbon disulfide in a light petroleum distillate. Sulfiding was carried out at 1 V/V/Hr., 1,500 psig, and 1,500 SCF/B hydrogen rate. The reactor was held at 500°F. for 2 hours and then raised to 750°F. and held there for 16 hours. The temperature was lowered to near 700°F. and feed was cut in. The feedstock was s Safaniya residuum having the properties set forth in Table I. Side-by-side comparative runs were made to give a direct comparison to measure the activity decline of the catalyst. The pressure was 1,500 psig., the space velocity was 1 V/V/Hr., and the hydrogen rate was 1,500 SCF/Bbl. The reactor temperature was increased as necessary to obtain 55 percent desulfurization of the residuum.

Catalyst A was select for comparison because it was effective in hydrodesulfurization of distillate stocks. It contained 3.5 wt. % CoO and 12.5 wt. % $MoO_3$ on a support containing 0.2 wt. % $SiO_2$ and the balance alumina. Catalyst B is prepared in a manner set forth earlier in this specification. FIG. 1 sets forth the temperature increase requirement (TIR) for runs with Catalyst A and Catalyst B. The TIR for Catalyst B is 0.17°F./day, showing a very low activity decline. Catalyst A exhibited the usual initial high activity decline, then lined out at a TIR of 1.7°F./day. Thus Catalyst B has an activity maintenance 10 times better than that of Catalyst A. This result was completely unexpected because the two catalysts demonstrated no such difference in the hydrodesulfurization of distillates.

Runs with Catalyst B demonstrate the following improvements: (1) greatly improved catalyst life, (2) lower pressure operation (1,500 vs. 2,200 psig, which was previously considered necessary for good catalyst life), and (3) lower gas rates (1,500 vs. 3,000 SCF/Bbl. also previously considered necessary for good catalyst life). In addition, the new catalyst shows about half the metals laydown usually experienced with petroleum residuum feeds. These improvements make residuum hydrodesulfurization by our process attractive from a cost standpoint.

Kuwait atmospheric residuum (3.8 wt. % S) was desulfurized over Catalysts A and B at 800 psig., 1 V/V/Hr., 1,500 SCR $H_2$ per barrel of feed for Catalyst B and 3,000 SCF $H_2$ per barrel of feed for Catalyst A, and initial temperature of 685°F. The initial desulfurization was 66 percent for Catalyst B and 42 percent for Catalyst A in spite of the higher gas rate for Catalyst A. After 50 days, the desulfurization with Catalyst B was still 50 percent at 685°F., whereas it was only 34 percent for the Catalyst A at 700°F. It is obvious that Catalyst B has higher activity and much better activity maintenance with this feedstock.

EXAMPLE 4

Table V shows the relative activity of a number of hydrodesulfurization catalysts. All runs were carried out on Safaniya atmospheric residuum (4.0% S) at the following conditions: 1,500 psig., 725°F., 3,000 SCF $H_2$/Bbl., 1 V/V/Hr., 60 cc. catalyst.

TABLE V

| Catalyst | Composition (alumina plus the following materials) (wt. percent) | Bulk density | Rel. vol. act. for day | | | |
|---|---|---|---|---|---|---|
| | | | 1 | 7 | 14 | 21 |
| A | 3.5 CoO, 12.5 $MoO_3$, 0.2 $SiO_2$ | 0.66 | *100 | 58 | 43 | 36 |
| B | 3.5 CoO, 12.0 $MoO_3$, 1.7 $SiO_2$ | 0.65 | 180 | 140 | 115 | 110 |
| C | 4.0 NiO, 15.0 $MoO_3$, 3.4 $SiO_2$ | 0.65 | 150 | 115 | 100 | 90 |
| D | 10.0 CoO, 20.0 $MoO_3$, 3.9 $SiO_2$ | 1.0 | 160 | 113 | 105 | 100 |
| E | 10 NiO, 20.0 $MoO_3$, 3.9 $SiO_2$ | 0.88 | 160 | 113 | 105 | |
| F | 7.0 NiO, 23.0 $WO_3$, 3.9 $SiO_2$ | 0.88 | 94 | 70 | 63 | 60 |
| G | 3.5 CoO, 12.5 $MoO_3$, 6.0 $SiO_2$ | 0.59 | 280 | 105 | 65 | 50 |
| H | 3.5 CoO, 12.5 $MoO_3$, 8.6 $SiO_2$ | 0.57 | 280 | 80 | 50 | 35 |
| I | 6.0 NiO, 13.0 $MoO_3$, 14.0 $SiO_2$ | 0.54 | 160 | 45 | | |
| J | 4.0 NiO, 15.0 $MoO_3$, 0.3 $SiO_2$ | 0.59 | 70 | 40 | | |

*Equivalent to 67% desulfurization or 1.3 wt. % S in product with 4.0 wt. % S in feed.

The relative volume activity of the catalysts employed in the process of the invention, i.e., catalysts B, C, D, E, F, and G is far superior to the activity of the prior art catalysts, i.e., A, H, I and J. The results reveal the criticality of silica in the range of about 0.5 to 6 wt. percent in the catalyst base in attaining high activity and activity maintenance. Since catalysts are sold by the pound, we prefer the catalysts having the lowest metals content and bulk density which will give superior activity maintenance, i.e., catalysts like Catalyst B.

The catalysts employed in the process of the invention have excellent surface area stability and they are effectively regenerated by conventional techniques at temperatures ranging from 600°–1,000°F.

EXAMPLE 5

Catalysts A and B of the first two examples have some similar properties as shown by lines one to five of Table VI, below. For example, the overall surface areas are nearly equivalent. However, the nature of the surface areas are considerably different. Catalyst A has a surface area in 30 to 70 A diameter pores of 86 square meters per gram. Catalyst B has a surface area in 30 to 70 A diameter pores of 174 square meters per gram. The relatively large surface area in the pores in the 30 to 70 A diameter range of Catalyst B seems to be one of the reasons for its extended life in processing residua.

TABLE VI

| | Cat. A. | Cat. B. | Cat. E |
|---|---|---|---|
| Surface Area, $M_2$/g. | 253 | 266 | 271 |
| Pore Volume, cc./g. | 0.58 | 0.50 | 0.24 |
| Bulk Density, g./cc. | 0.63 | 0.71 | 0.88 |
| Pellet Density, g./cc. | 1.10 | 1.20 | — |
| Pellet Strength | 11.0 | 16.5 | — |
| $SiO_2$, Wt. % | 0.2 | 2.0 | 3.9 |

| | | | |
|---|---|---|---|
| CaMoO₄, Wt. % (by X-ray) | 2 | 0 | 0 |
| Surface Area in 30–70 A. Pores, M²/g. | 86 | 174 | 136 |
| Relative Wt. Activity at Day 21 | 36 | 91 | 67 |

After 21 days of operation at the conditions set forth in Examples 4 and 5, Catalyst B had a weight activity of 91 compared to a weight activity of only 36 for Catalyst A. Weight activity is determined by Relative Vol. Activity × (Bulk Density of Reference Catalyst/Bulk Density of Test Catalyst)

In a series of comparative runs, Catalyst B proved to have at least five times as much catalyst life as Catalyst A. Similarly, Catalysts C and E which are nickel-molybdenum type catalysts had a high relative weight activity. Thus, a surface area in 30 to 70 A diameter pores of at least 100 M²/g., preferably 100–300 M²/g., provides excellent activity and activity maintenance. It had been previously thought by the inventors that the critical pore size range was 30–70 A in diameter (U.S. Pat. No. 3,509,044); however, it is now believed by the present inventors that this range extends from 30–80 A in diameter. A preferred catalyst is one having at least 180 M²/g. of surface area in pores of diameters ranging 30 to 80 A, and less than 0.25 cc./g. of the pore volume in pores having a diameter greater than 100 A.

ing (a) large surface area — 314 M²/g.; (b) small pore volume in macropores, i.e., in pores with diameters greater than 100 A; and (c) a large surface area in pores with diameters ranging between 30 to 80 A (235 M²/gram). The hydrogenation component comprises 3.5 weight percent cobalt oxide and 12.5 weight percent molybdenum oxide; the catalyst also contains 1.8 wt. % SiO₂.

Catalyst L, a prior art catalyst, also described in detail in Tables VII and VIII, is similar in composition to Catalyst K, having a relatively high surface area, i.e., 302 M²/g. Pore volume in pores with diameters greater than 100 A is also low. However, as shown by reference to Table VIII, Catalyst L has almost 40 percent of its surface area in pores having diameters below 30 A. Moreover, the surface area in pores having diameters between 30 and 80 A is relatively low, i.e., 176 M²/g.

Catalyst M is similar in composition to Catalyst K, also having a relatively high surface area. In Catalyst M, however, it will be observed that the surface area in pores having diameters greater than 80 A, as well as pore volume in pores with diameters greater than 100 A, as observed by specific reference to Table VIII, are high in comparison to catalyst K, the catalyst of this invention.

TABLE VII.—SPECIFIC INSPECTION OF CATALYST PORE SIZE DISTRIBUTIONS

| | Catalyst K | | Catalyst L | | Catalyst M | |
|---|---|---|---|---|---|---|
| Diameter Å | Pore volume | Surface area | Pore volume | Surface area | Pore volume | Surface area |
| 600–500 | 0.5 | 0.0 | 0.5 | 0.0 | 3.9 | 0.6 |
| 500–400 | 0.8 | 0.1 | 0.8 | 0.0 | 5.0 | 1.0 |
| 400–300 | 1.4 | 0.2 | 1.3 | 0.1 | 6.2 | 1.6 |
| 300–200 | 3.2 | 0.8 | 2.5 | 0.4 | 7.2 | 2.6 |
| 200–180 | 1.2 | 0.4 | 0.8 | 0.1 | 2.2 | 1.0 |
| 180–160 | 1.6 | 0.6 | 1.0 | 0.2 | 2.7 | 1.4 |
| 160–140 | 2.5 | 1.0 | 1.2 | 0.3 | 3.4 | 2.1 |
| 140–120 | 4.2 | 2.0 | 1.6 | 0.5 | 5.2 | 3.6 |
| 120–100 | 7.2 | 4.2 | 2.3 | 0.9 | 8.4 | 7.0 |
| 100–90 | 5.4 | 3.6 | 1.6 | 0.7 | 6.1 | 5.8 |
| 90–80 | 7.7 | 5.8 | 2.3 | 1.1 | 8.4 | 8.9 |
| 80–70 | 9.6 | 8.4 | 3.7 | 2.0 | 9.9 | 12.0 |
| 70–60 | 12.5 | 12.3 | 6.2 | 3.9 | 10.8 | 15.1 |
| 60–50 | 13.9 | 16.1 | 10.2 | 7.7 | 10.5 | 17.4 |
| 50–40 | 14.6 | 20.7 | 17.6 | 16.4 | 9.4 | 19.1 |
| 40–30 | 12.6 | 23.0 | 23.5 | 28.2 | 0.0 | 0.0 |
| 30–20 | 0.0 | 0.0 | 22.2 | 36.6 | 0.0 | 0.0 |
| 20–14 | 0.0 | 0.0 | 0.0 | 0.0 | 0.0 | 0.0 |
| Pore vol. in pores less than 600 Å, Ml./g | 0.49 | | 0.29 | | 0.67 | |
| Surface Area, M²/g | | 314 | | 302 | | 313 |

The following comparative data were selected to illustrate the superior activity of the catalysts of this invention which have a majority of the surface area in pores having diameters ranging between 30 to 80 A as contrasted with prior art catalysts of different pore size distributions. In the series of hydrodesulfurization runs specifically described by reference to Example 6, immediately following, a catalyst K characterized as having at least 180 M²/g. of surface area in pores with diameters ranging from 30 to 80 A and less than 0.25 cc./g. of its pore volume in pores of diameter greater than 100 A, is compared with prior art catalysts L and M of different, and more random pore size distribution, the runs being conducted at similar operating conditions.

EXAMPLE 6

Catalyst K was prepared to provide a silica-alumina catalyst as in the preferred practice of this invention. This catalyst, the properties of which are described in detail by reference to Tables VII AND VIII, is one hav-

TABLE VIII

CATALYST INSPECTIONS

| Catalyst | K | L | M | |
|---|---|---|---|---|
| Feedstock | TJM[1] | TJM | TJM | |
| Composition, Wt. % | | | | |
| CoO | 3.5 | — | 3.4 | |
| NiO | — | 3.7 | — | |
| MoO₃ | 12.5 | 13.1 | 12.7 | |
| SiO₂ | 1.8 | 0.8 | 4.0 | |
| Physical Properties | | | | |
| Surface Area, M²/g. | 314 | 302 | 313 | |
| Total Pore Volume, ML/G | 0.50 | 0.35 | 0.78 | |
| Avg. Pore Diameter, A. | 63.7 | 46.4 | 99.7 | |
| Bulk Density, G/ML | 0.70 | 0.82 | 0.52 | |
| Catalyst Form — | 14×35 | 14×35 | 14×35 | |
| As Tested | Mesh | Mesh | Mesh | |
| Pore Volume in Pores with Diameters Greater than 100 A., ML/G | 0.12 | 0.10 | 0.41 | |
| Surface Area in Pores with Diameters between 30 A. and 80 A., Sq. M/G | 235 | 176 | 199 | |
| Catalyst | N | O | P | Q |
| Feedstock | SAF[2] | SAF | SAF | TJM |
| Composition, Wt. % | | | | |

| | | | | |
|---|---|---|---|---|
| CoO | 3.5 | — | 3.5 | 3.6 |
| NiO | — | 10.0 | — | — |
| MoO$_3$ | 12.0 | 20.0 | 12.5 | 20.5 |
| SiO$_2$ | 1.7 | 3.9 | 0.2 | — |
| Physical Properties | | | | |
| Surface Area, M$^2$/g. | 260 | 271 | 224 | 182 |
| Total Pore Volume, ML/G | 0.49 | 0.26 | 0.58 | 0.51 |
| Avg. Pore Diameter, A. | 75.4 | 38.4 | 103.6 | 112.1 |
| Bulk Density, G/ML | 0.68 | 0.88 | 0.66 | 0.55 |
| Catalyst Form — As Tested | 14×65 Mesh | 14×65 Mesh | 14×65 Mesh | 14×65 Mesh |
| Pore Volume in Pores with Diameters Greater than 100 A., ML/G | 0.15 | 0.02 | 0.33 | 0.30 |
| Surface Area in Pores with Diameters between 30 A. and 80 A., Sq. M/G | 190 | 147 | 117 | 81 |

[1] Tia Juana Medium Atmos. Btms.; 15.2°API gravity; 2.13% sulfur; 277 ppm vanadium; 33.5 ppm nickel.

[2] Safaniya Atmos. Btms.; 15.4°API gravity; 4.0% sulfur; 84 ppm vanadium; 32 ppm nickel.

Figure 2:
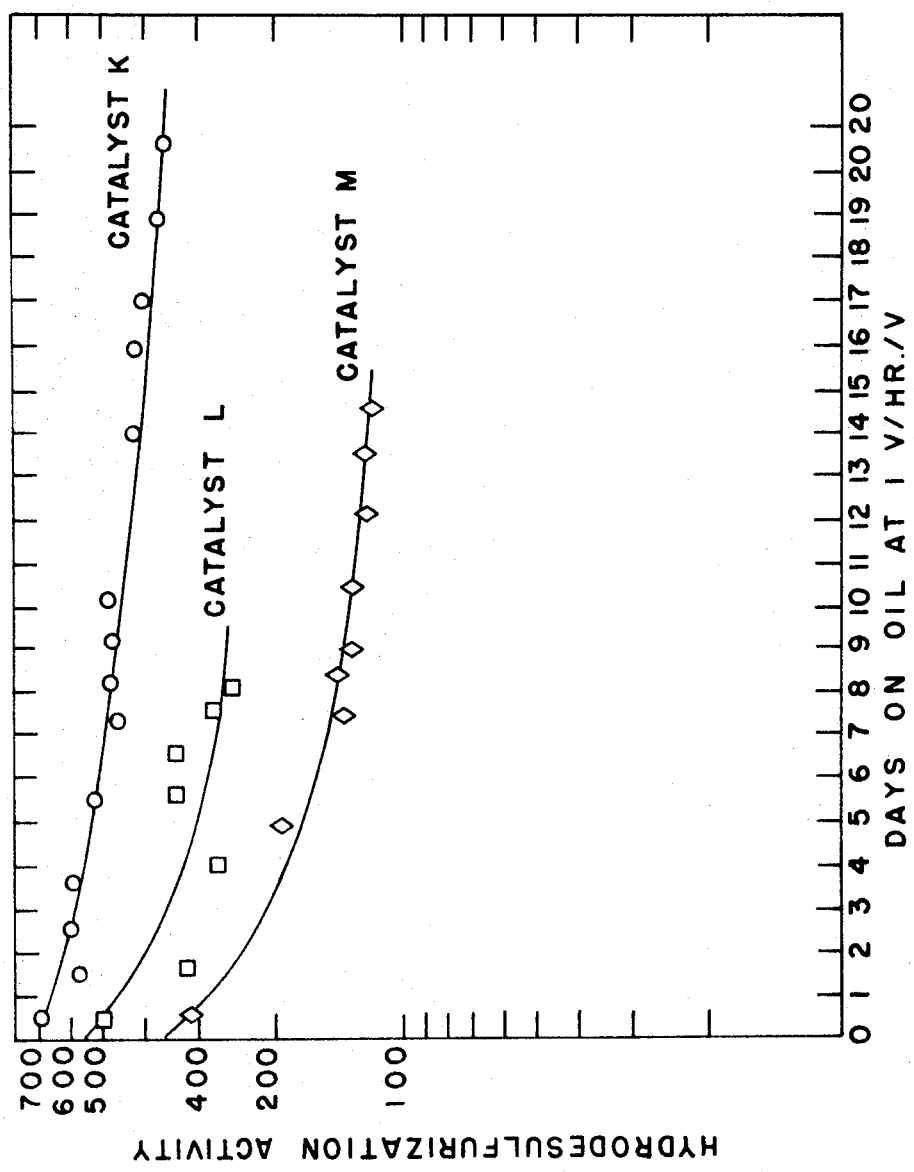

A Tia Juana Medium (TJM) atmospheric residuum described by reference to Table VIII was desulfurized, in the presence of hydrogen, by passage over catalysts, K, L and M, respectively, and the activities of the catalysts compared. In each of the runs, the catalyst sulfiding was carried out as described in Example 3. At the end of the sulfiding period, the temperature was lwoered to 725°F. and feed was cut in. The runs were conducted at 1,500 psig, a space velocity of 1 V/V/Hr., and a hydrogen rate of 3,000 SCF/Bbl. As the hydrodesulfurization runs progressed, the amount of desulfurization gradually decreased from day-to-day. The relative hydrodesulfurization activity of each of individual Catalysts K, L and M, calculated for the TJM feed from Second Order kinetics in sulfur removal from petroleum residua according to scale calculated by 100 × (observed rate constant ÷ standard rate constant), is graphically described for a 21-day period by reference to FIG. 2.

The activity plots for these catalysts clearly demonstrate the crucial nature of the dual requirement relative to the amount of surface area existing in pores having diameters ranging between 30 to 80 A and less than 0.25 cc./g. of the pore volume of the catalyst in pores of diameter greather than 100 A. Thus it will be observed, on the one hand, that the hydrodesulfurization activity of Catalyst L declined more rapidly than Catalyst K due to the lower surface area in pores with diameters ranging 30 to 80 A, despite its low macropore volume. Catalyst M, on the other hand, was poorer than both Catalysts K and L because of its high macropore volume, despite its relatively high surface area in pores of diameter ranging 30 to 80 A.

EXAMPLE 7

To further illustrate the novelty of the catalysts of this invention, Catalysts N, O, P and Q were prepared, these catalysts having the properties shown in Table VIII, supra. In addition, the percentage of surface area in pores of varying diameter, as well as percent of pore volume in these pore sizes, are listed in Table IX.

Of these catalysts, Catalyst N was prepared to meet the specifications required of the catalyst of the present invention. By reference to Table IX it will be observed that Catalyst O has 73.2 percent of its surface area in pores having diameters ranging between 30 to 80 A. Total surface areas were somewhat reduced in this series of experiments as a result of calcination of Catalysts N, O and P, at a temperature of 1,200°F. However, this only serves to further illustrate the importance of surface area concentration within a certain pore size range, as compared with just a so-called "large surface area."

In addition, Catalyst O was prepared in a manner designed to essentially duplicate a prior art catalyst (that disclosed in U.S. Pat. No. 3,340,180 to Beuther et al.).

Figure 3:
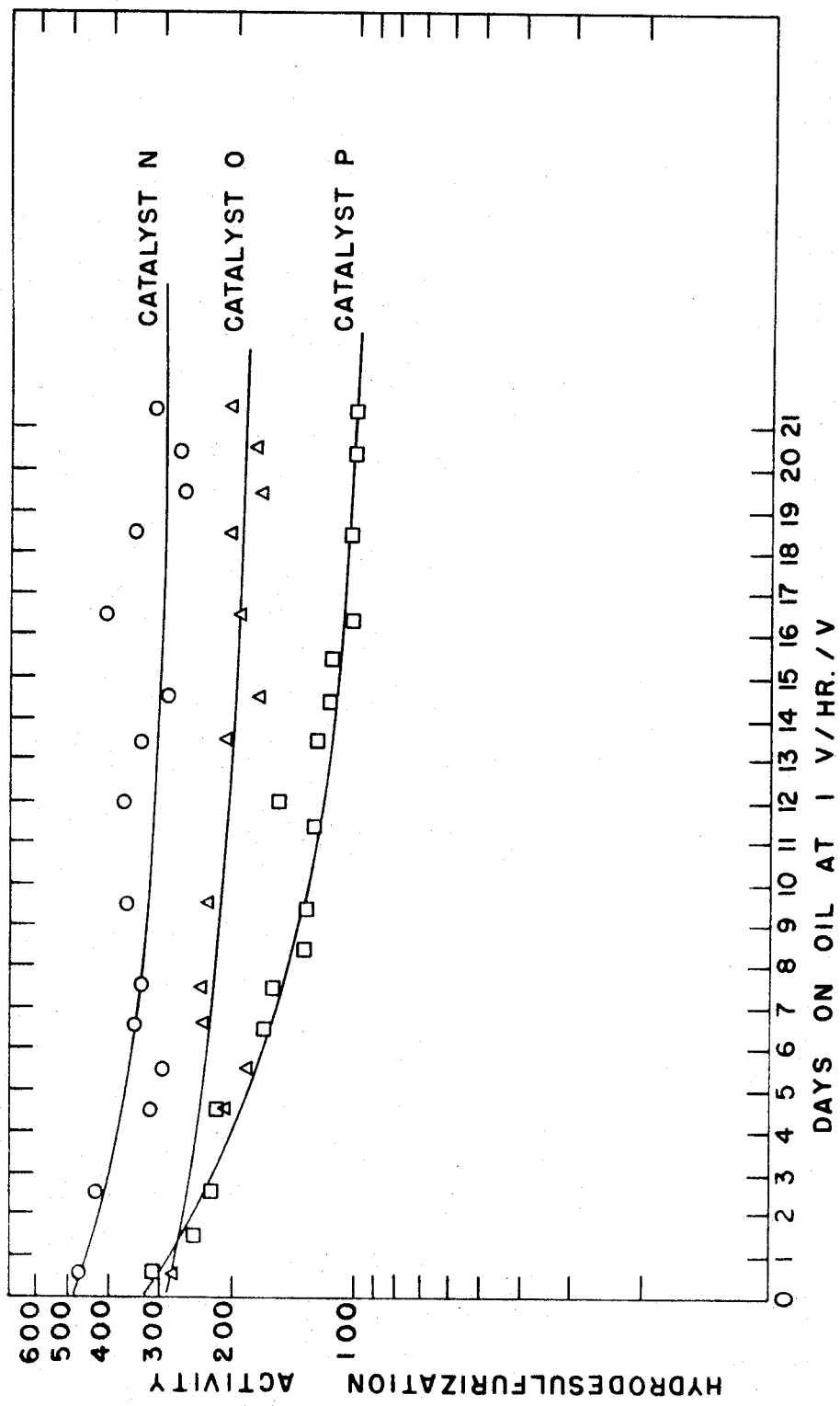

A series of runs was conducted as described by reference to Example 6 except that a Safaniya atmospheric residuum was used as a feed, and the runs were conducted at 700°F. Comparison of the hydrodesulfurization activities of these catalysts were made, the results being graphically described by reference to FIG. 3. It is thus clearly shown that both Catalysts O and P are significantly less active than Catalyst N. Catalyst O is

TABLE IX.—CATALYST PORE SIZE DISTRIBUTION

| Diameter Å | Catalyst N | | Catalyst O | | Catalyst P | | Catalyst Q | |
|---|---|---|---|---|---|---|---|---|
| | Pore volume | Surface area | Pore volume | Surface area | Pore volume | Surface area | Pore volume | Surface area |
| 600–500 | 1.0 | 0.1 | 0.4 | 0.0 | 1.0 | 0.2 | 1.7 | 0.3 |
| 500–400 | 1.6 | 0.2 | 0.4 | 0.0 | 1.7 | 0.3 | 3.1 | 0.8 |
| 400–300 | 2.6 | 0.5 | 0.6 | 0.1 | 2.9 | 0.8 | 6.1 | 1.9 |
| 300–200 | 5.1 | 1.5 | 0.9 | 0.1 | 7.3 | 2.7 | 18.3 | 9.3 |
| 200–180 | 1.7 | 0.6 | 0.2 | 0.0 | 2.5 | 1.2 | 4.8 | 2.8 |
| 180–160 | 2.2 | 0.9 | 0.3 | 0.1 | 4.1 | 2.2 | 6.1 | 4.0 |
| 160–140 | 3.2 | 1.6 | 0.4 | 0.1 | 6.5 | 3.9 | 9.0 | 6.7 |
| 140–120 | 5.0 | 2.8 | 0.9 | 0.3 | 9.0 | 6.3 | 6.9 | 6.0 |
| 120–100 | 8.3 | 5.6 | 1.7 | 0.6 | 12.4 | 10.3 | 12.7 | 13.2 |
| 100–90 | 6.0 | 4.6 | 1.3 | 0.5 | 9.8 | 9.3 | 5.2 | 6.1 |
| 90–80 | 8.4 | 7.3 | 3.1 | 1.4 | 10.1 | 10.7 | 3.6 | 4.7 |
| 80–70 | 10.7 | 10.5 | 4.5 | 2.3 | 9.3 | 11.2 | 4.7 | 7.0 |
| 70–60 | 12.6 | 14.3 | 6.9 | 4.0 | 8.5 | 11.7 | 7.3 | 12.6 |
| 60–50 | 13.1 | 17.6 | 11.4 | 7.8 | 6.5 | 10.7 | 4.9 | 9.9 |
| 50–40 | 12.3 | 20.2 | 17.3 | 14.7 | 4.7 | 9.5 | 5.1 | 12.7 |
| 40–30 | 5.3 | 10.6 | 23.4 | 25.5 | 3.7 | 9.3 | 0.7 | 2.0 |
| 30–20 | 0.0 | 0.0 | 22.6 | 34.9 | 0.0 | 0.0 | 0.0 | 0.0 |
| 20–14 | 0.0 | 0.0 | 3.8 | 7.6 | 0.0 | 0.0 | 0.0 | 0.0 |
| Pore vol. in pores less than 600 Å, ML/G | 0.49 | | 0.25 | | 0.47 | | 0.51 | |
| Surface Area, Sq. M/G | | 260 | | 271 | | 224 | | 182 | less active than Catalyst N, even though the total surface area of Catalyst O is higher than that of Catalyst N. Reduction in activity is found directly attributable to Catalyst O having a lower surface area in pores having diameters in the range 30 to 80 A which is illustrated by the fact that the percent surface area in pores having diameters less than 30 A is 42.5 percent.

Catalyst P is illustrative of the effect of low surface area in pores having diameters in the 30 to 80 A range and high pore volume in pores with diameters greater than 100 A. This catalyst, it will be observed, is roughly comparable to the reference-type catalyst of Catalyst M, but having been calcined at 1,200° F. as was Catalyst N, of the present invention.

EXAMPLE 8

To illustrate the reduced activity of a catalyst having a wide distribution of pore sizes as compared with a catalyst of this invention, Catalyst Q, having the characteristics described by reference to Tables VIII and IX, was prepared and tested by desulfurizing a Tia Juana residuum feed as described, and at the conditions described, by reference to Example 6. The relative activity of this catalyst is compared with that of Catalyst K run at similar conditions, as shown by reference to FIG. 4.

The activity plots of these Catalysts K and Q, and other comparative data, thus clearly demonstrate the critical nature of maximizing pore sizes in the 30 to 80 A range, and minimizing pore sizes ranging greater than 100 A.

EXAMPLE 9

To illustrate the use of the catalyst of this invention with a hydrocarbon residuum feed other than petroleum residua, the following data were obtained.

A feedstock was prepared by forming a slurry from two parts of hydrogenated creosote oil and one part Illinois No. 6 coal and passing the slurry through a liquefaction reaction at about 675°F., 350 psig, 1 V/V/Hr. and a hydrogen treat rate of about 0.5 wt. percent on coal. The liquified product was centrifuged twice at 350°F. to separate the bulk of the solids. The centrifuge overflow was used in these studies. Inspections of the feedstock are given below:

Wt. % Ash — 0.1
Wt. % Carbon — 89.5
Wt. % Hydrogen — 7.17
Wt. % 700°F. + — 36.0
Wt. % Nitrogen — 0.68
Wt. % Sulfur — 0.54
Wt. % Oxygen — 2.29
Specific Gravity — 1.0934

The feedstock was contacted in a series of runs with Catalyst R, a catalyst of the present invention, and other commercially used desulfurization catalysts, S, T, and U, not of this invention. These catalysts, characertized below, and used at the process conditions defined in Table X below, removed both nitrogen and sulfur, but Catalyst R was generally superior to the others in such capacity.

TABLE X

| Catalyst | Description | Surface Area |
|---|---|---|
| R | Cobalt Moly on Alumina ⅛" extrudate 1.8 Wt. % SiO$_2$ | 337 |
| S | Nickel Moly on Silica Alumina — ⅛" pills | 186 |
| T | Ni Moly on Alumina ⅛" pills | 173 |
| U | Ni-W on Faujasite ⅛" pills | — |

Conditions: 1.1 W/Hr./W, 700°F., 2000 psig, 5000 Cu.Ft./Bbl.

Results:

| Catalyst | R | S | T | U* |
|---|---|---|---|---|
| Day 1 Conv. Denitrogenation, Wt. % | 41 | 36 | 42 | 23 |
| Desulfurization, Wt. % | 67 | 60 | 64 | 42 |
| TIR for Denitrogenation, °F./Day | 0 | 1.7 | 1.0 | — |
| TIR for Desulfurization, °F./Day | 0 | 0.55 | 3.0 | — |

*3000 psig

It is well known that hydrodesulfurizjtion of residua can be improved by subjecting the feed to such pretreating steps as deasphalting, dilution, metals removal, etc.; however, usually the cost of the multistep processes cannot be justified. The process of this invention provides adequate sulfur removal without any other major treating steps unless the feed has a very high metals content.

The catalysts of this invention are sufficiently active so that hydrodesulfurization reaction pressures in the range of 200 to 2,500 psig are satisfactory, depending upon feedstock. Prior art processes require pressures of 2,500 to 3,000 psig. and a high treat gas recycle because of the low activity of the catalyst. Furthermore, they require 25 percent more investment and higher operating costs to achieve the same throughput. With respect to temperature, hydrodesulfurization above 825°F. is not practical because of excessive gas make and hydrogen consumption. The process of the invention operates well at lower temperatures. Conversion to light ends, gasoline and other light stocks is less than about 15 wt. percent based on the feedstock.

Having described the invention, what is claimed is:

1. A process for the hydrodesulfurization of a petroleum residuum comprising contacting said residuum with a catalyst at a temperature ranging from 650° up to about 800°F., a pressure of from 500 to 2,500 psig and hydrogen at a rate of 1,000 up to 5,000 standard cubic feet per barrel (SCF/B), at a space velocity of from 0.05 to about 5.0 V/V/Hr., said catalyst comprising the oxide or sulfide of a Group VIB metal and the oxide or sulfide of a Group VIII metal deposited upon a support material comprising a silica-stabilized alumina containing 1–6 weight percent of silica, said catalyst having a surface area of at least 150 M$^2$/g. and more than 50 percent of the surface area being in pores having diameters ranging from 30 to 80 A.

2. The process of claim 1 wherein the petroleum residuum feed is one in which 30 – 100 percent of the feed boils above 900°F.

3. The process of claim 1 wherein the silica content of the alumina-silica composition ranges from about 1.5 – 5 weight percent.

4. The process of claim 1 wherein the Group VIB oxide or sulfide is selected from the group consisting of molybdenum oxide, molybdenum sulfide, tungsten oxide, tungsten sulfide, and mixtures thereof, and the Group VIII oxide or sulfide is selected from the group consisting of nickel oxide, cobalt oxide, nickel sulfide, cobalt sulfide, and mixtures thereof.

5. The process of claim 4 wherein the oxide or sulfide of the Group VIB metal and Group VIII metal comprises a mixture selected from the group consisting of nickel oxide with molybdenum oxide and cobalt oxide with molybdenum oxide.

6. A process for the hydrodesulfurization of a hydrocarbon residuum feed comprising contacting said residuum with a catalyst at a temperature ranging from 500°F. to about 825°F., a pressure of from 200 to about 2,500 psig and hydrogen at a rate of 300 to about 10,000 standard cubic feet per barrel (SCF/B), at a space velocity of from 0.01 to about 5.0 V/V/Hr., said catalyst comprising the oxide or sulfide of a Group VIB metal and the oxide or sulfide of a Group VIII metal deposited upon a support material comprising a silica-stabilized alumina containing 0.5-6 weight percent of silica, said catalyst having at least 180 $M^2$/g. of surface area in pores with diameters ranging from 30 to 80 A, and less than 0.25 cc./g. of the pore volume in pores having a diameter greater than 100 A.

7. The process of claim 6 wherein the hydrocarbon residuum feed is one in which 30 – 100 percent of the feed boils above 900°F.

8. The process of claim 6 wherein the conditions of operation are as follows:
Temperature, °F — 650–800
Pressure, Psig — 500–1,800
Space Velocity, V/V/Hr. — 0.1–2.0
Hydrogen Rate, SCF/Bbl — 1,000–7,500

9. The process of claim 6 wherein the Group VIB oxide or sulfide is selected from the group consisting of molybdenum oxide, molybdenum sulfide, tungsten oxide, tungsten sulfide, and mixtures thereof, and the Group VIII oxide or sulfide is selected from the group consisting of nickel oxide, cobalt oxide, nickel sulfide, cobalt sulfide, and mixtures thereof.

10. The process of claim 9 wherein the oxide or sulfide of the Group VIB metal and Group VIII metal comprises a mixture selected from the group consising of nickel oxide with molybdenum oxide and cobalt oxide with molybdenum oxide.

11. The process of claim 9 wherein the concentrations of the catalytic metals, expressed as the oxide, is as follows:
Nickel or Cobalt — 1 – 15 wt. %
Tungsten or Molybdenum — 5 – 25 wt. %

12. The process of claim 11 wherein the concentration of nickel or cobalt and tungsten or molybdenum ranges 2 – 10 and 10 – 20 weight percent, respectively.

13. The process of claim 6 wherein the silica ranges from 1 – 5 weight percent.

* * * * *